May 9, 1939. V. BUSH 2,157,229
APPARATUS FOR COMPRESSING GASES
Filed July 17, 1935 3 Sheets-Sheet 1
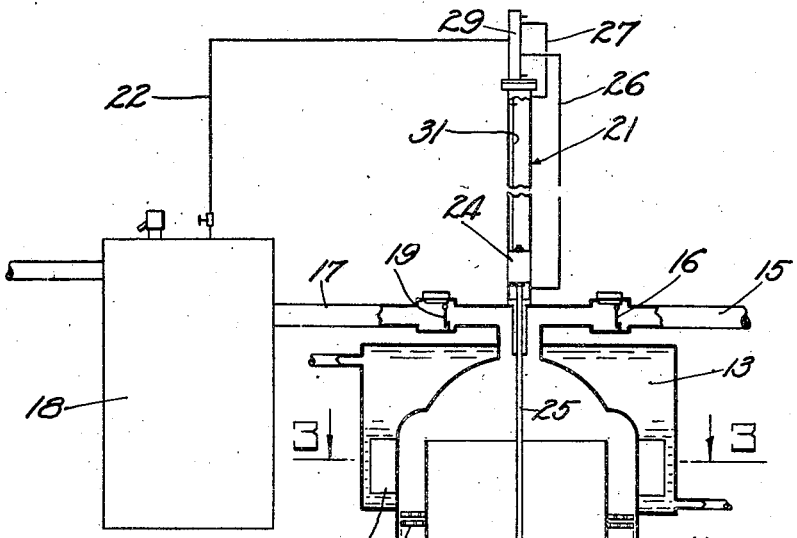
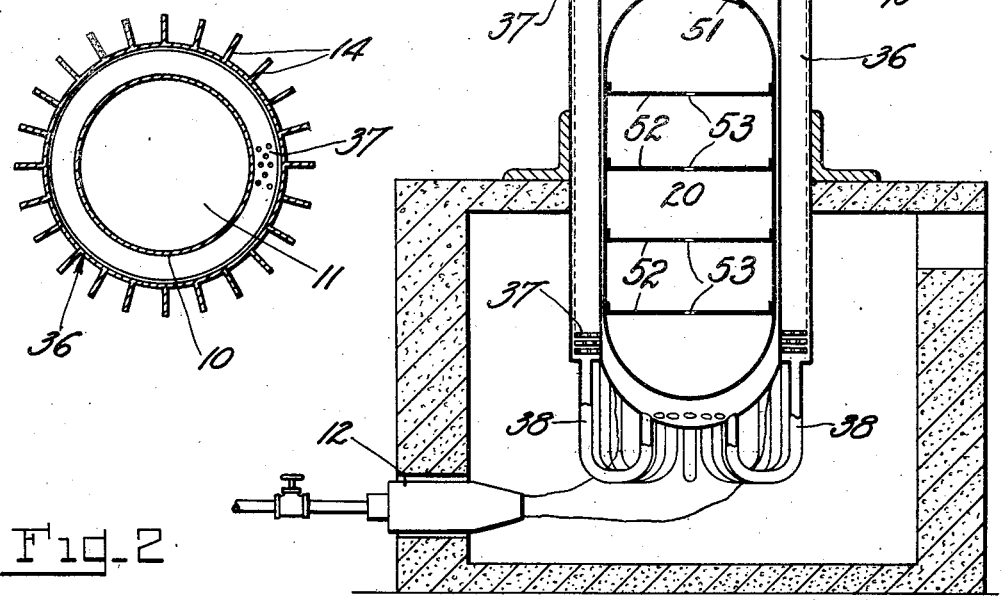
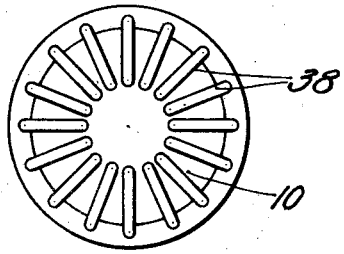
INVENTOR:
Vannevar Bush.
By Dike, Calver & Gray.
Attys.

May 9, 1939.  V. BUSH  2,157,229
APPARATUS FOR COMPRESSING GASES
Filed July 17, 1935  3 Sheets-Sheet 2
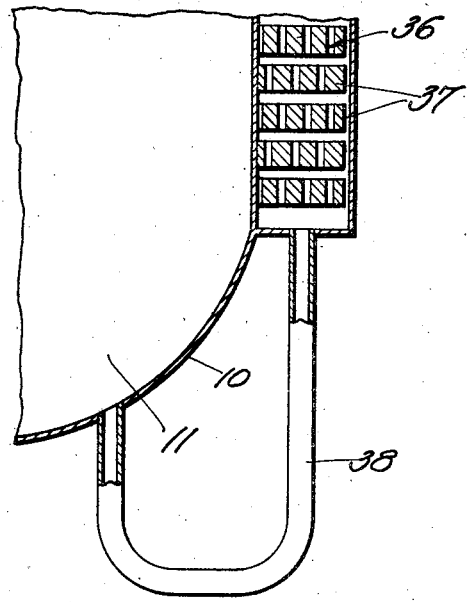
Fig_4
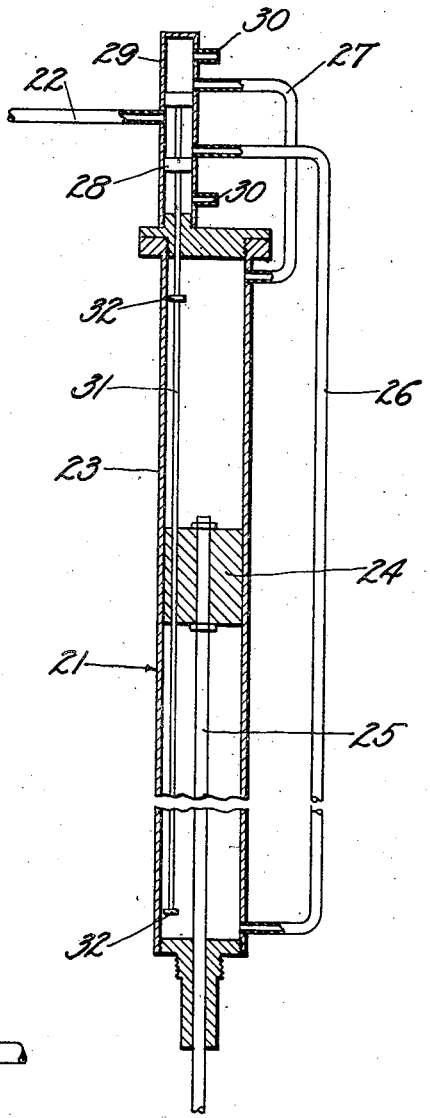
Fig_5
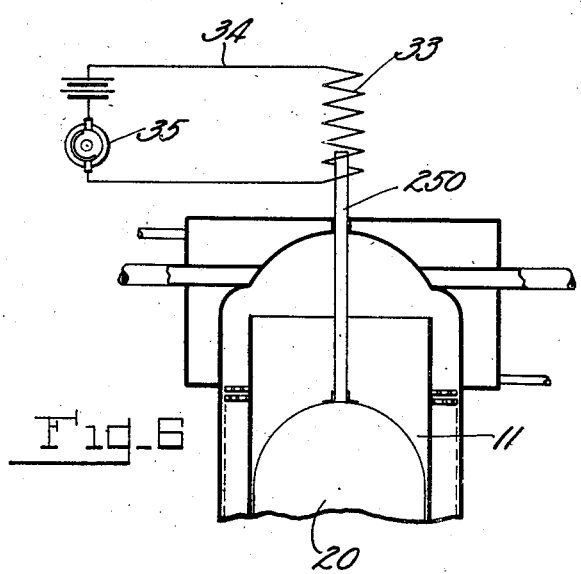
Fig_6
INVENTOR:
Vannevar Bush.
by Dike, Calver & Gray
Attys.

May 9, 1939.     V. BUSH     2,157,229
APPARATUS FOR COMPRESSING GASES
Filed July 17, 1935     3 Sheets-Sheet 3
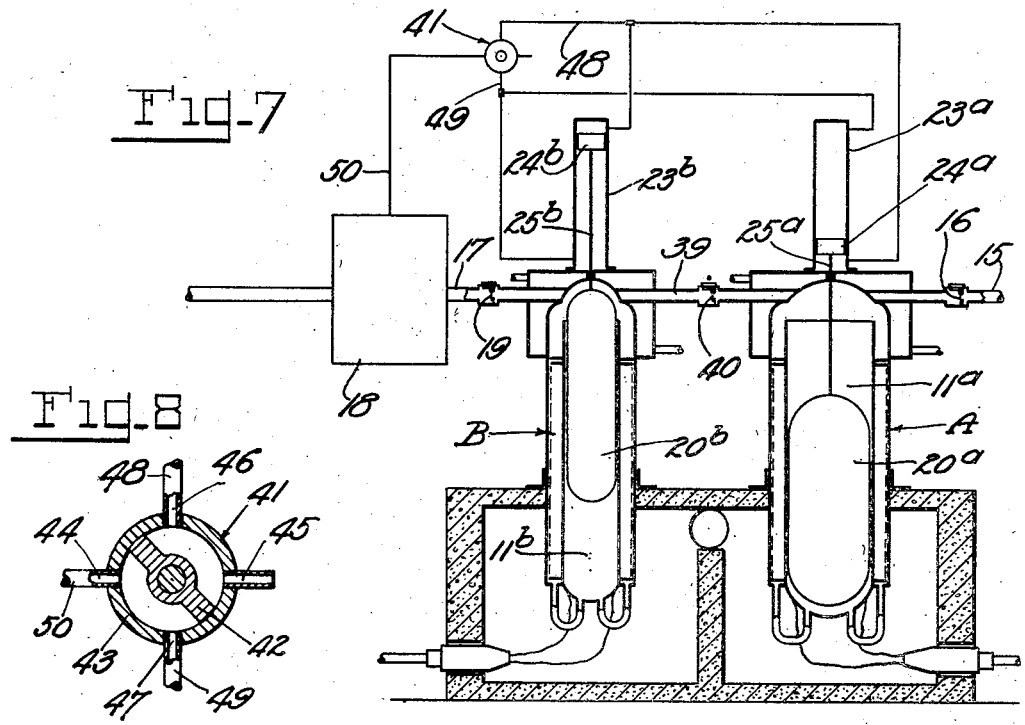
Fig.7
Fig.8
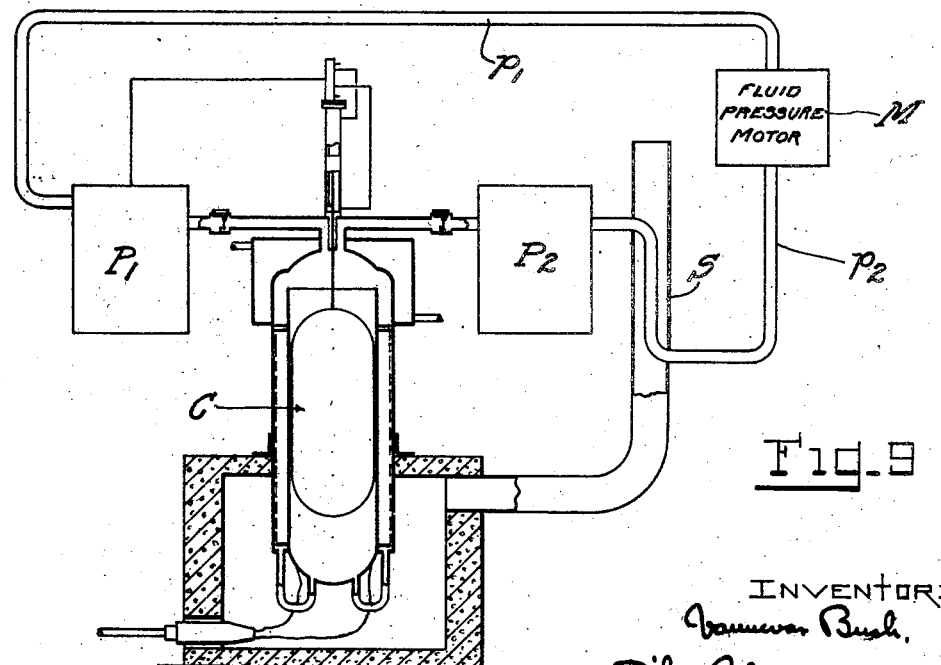
Fig.9
INVENTOR:
Vannevar Bush.
by Pike, Calver & Gray.
Attys.

Patented May 9, 1939

2,157,229

UNITED STATES PATENT OFFICE 2,157,229

APPARATUS FOR COMPRESSING GASES

Vannevar Bush, Belmont, Mass., assignor, by mesne assignments, to Research Corporation, New York, N. Y., a corporation of New York Application July 17, 1935, Serial No. 31,859

6 Claims. (Cl. 60—59)

The present invention relates to new and improved means to compress gases. The apparatus embodying my invention operates by the thermal expansion of gas in a closed chamber and transforms heat energy into the potential energy of compressed gas without the interposition of mechanical power. For convenience, therefore, it may be referred to as a direct compressor or a direct thermal compressor.

The transformation of heat energy into the potential energy of compressed gas has heretofore involved two steps requiring the employment of two mechanical units, namely, the conversion of the heat energy into mechanical power by means of a suitable engine or power unit, and the utilization of this power to actuate a second or compressor unit. In mechanically operated compressors of the usual type, there is a space or chamber of variable volume produced by a piston, or, in the rotary type, by vanes or the interlinkage of gears, and the machine operates by entrapping gas in this variable volume chamber and by subsequently compressing it therein by mechanically reducing the volume of the chamber. In the centrifugal or turbine type of compressor the compression results from the energy of the gas which is given a high velocity by a member rotated by mechanical power. In my compressor the volume is constant but the gas is alternately heated and cooled, producing corresponding changes in the $pv$ value ($p$ being the pressure, and $v$ the specific volume), and this change in value is used directly to produce the transfer of gas from a region of relatively low pressure to a region of relatively high pressure. Thus, when gas in a confined space of fixed volume is cooled, thereby tending to decrease its pressure, sufficient additional gas to maintain the pressure substantially constant is allowed to enter said space from the low pressure region, whereupon the inflow of gas is checked. When the gas is heated, increasing the pressure in the space to a point above that in the high pressure region, forcing a portion of gas into the high pressure region and increasing the effective pressure therein. Thus the power unit is eliminated, the apparatus greatly simplified, and the efficiency increased.

While, in its theoretically simplest form, apparatus embodying my invention may be conceived as a chamber having inlet and outlet valves and means for alternately heating and cooling it, the gas being drawn through the inlet valve by cooling of the chamber and expelled under pressure through the outlet valve by heating it, it is more convenient in practice to employ two relatively hot and cold gas containers and means for transferring the gas alternately between said containers, and it is, specifically, still more convenient in practice to make the apparatus in the form of a chamber or cylinder one end of which is heated and the other end of which is cooled, and to provide a displacer to shift the gas alternately from the hot end to the cold end of the cylinder, and vice versa.

In its passage between hot and cold regions the gas is preferably caused to flow through a regenerator, that is, a passage containing heat storing material, and having a thermal gradient along its length, the thermal conductivity longitudinally being preferably small. The gas is thus caused to be heated and cooled gradually during its passage, rather than abruptly, with consequent improvement in efficiency.

If desired also, the high pressure region or reservoir, which receives the compressed gas, may itself be a cylinder provided with a displacer, in which case the exhaust valve of the first cylinder becomes the inlet valve of the second, and the compression is done in two or even in more stages.

The compressor embodying my invention permits the use of a wide range of operating temperature between its several regions and has a theoretical thermal efficiency which is much higher than that of any compressor of which I am aware, and it is possible to approach this efficiency in actual practice.

The invention will best be understood from the following description of the construction and operation of certain forms of apparatus, shown in the accompanying drawings, in which it may be embodied and by which it may be practiced, these, however, being chosen for purposes of exemplification merely, it being obvious that said invention, as defined by the claims hereunto appended, may be otherwise embodied and practiced without departure from the spirit and scope thereof.

In said drawings:

Fig. 1 is a somewhat diagrammatic sectional view of a simple form of compressor embodying my invention;

Fig. 2 is a bottom plan view of the cylinder shown in Fig. 1;

Fig. 3 is a section of the cylinder taken substantially on the line 3—3 of Fig. 1;

Fig. 4 is a fragmentary detail sectional view, on an enlarged scale, of a portion of the lower end of the cylinder and regenerator;

Fig. 5 is a similar view of the mechanism shown in Fig. 1 for operating the displacer;

Fig. 6 is a fragmentary diagrammatic view illustrating an alternative form of displacer operating means;

Fig. 7 is a view similar to Fig. 1, but further simplified, of a two-stage compressor embodying the invention;

Fig. 8 is a detail view of the timing valve indicated in Fig. 7;

Fig. 9 is a diagrammatic view of a power system embodying the invention.

Referring to Fig. 1, the compressor shown comprises a casing 10 enclosing a chamber 11. The lower end of the chamber is heated by suitable heating means, not necessarily outside the chamber, but which is shown as an oil or gas burner 12. The upper end of the chamber is cooled by suitable cooling means, as for instance a water jacket 13, the portion of the casing within said jacket being preferably provided with heat exchange fins 14. At 15 is shown an inlet passage controlled by an inlet valve 16 which, as illustrated, may be a check valve operated by suction. At 17 is shown an exhaust or discharge passage which leads to a discharge reservoir or accumulator 18. A valve 19, conveniently called the outlet valve, opens outwardly from the chamber 11 and prevents return flow from the reservoir 18. This valve may likewise be a check valve operated by the flow of gas.

Within the chamber 11 is a member 20, conveniently called a displacer, which is moved from one end to the other of the chamber periodically and is operated by any suitable means. As shown there is employed a small fluid pressure motor 21, somewhat similar to the motors employed for operating motor vehicle windshield wipers, and receiving fluid pressure from the accumulator 18 through a branch pipe 22. Referring to Fig. 5, the motor 21 comprises a cylinder 23 within which operates a piston 24 carried by the stem 25 of the displacer 20. Fluid pressure is alternately and alternatively supplied to and exhausted from opposite ends of the cylinder 23 through pipes 26 and 27 under the control of a valve 28 in a casing 29 with which the pipe 22 communicates, and which is provided with exhaust ports 30. The valve 28 is operated at suitable times to reverse the direction of movement of the piston 24 by a rod 31 connected with said valve and carrying stops or trips 32 which are engaged by the piston 24 when the latter approaches the opposite limits of its movement. Pressure may be built up in the accumulator for starting purposes by appropriate pump means, not shown, to operate the motor 21, although ordinarily, when the apparatus has been in operation and is shut down temporarily, sufficient pressure for this purpose will be retained in the accumulator.

In the modification shown in Fig. 6 the stem 25a of the displacer is operated by a solenoid 33 in an electric circuit 34 including a rotary switch or controller 35.

Preferably, and for the sake of thermal efficiency, the ends of the chamber 11 are connected by a regenerator 36 which, as shown, is an annular passage surrounding the casing 10 and chamber 11, communicating at its ends with the upper and lower ends of the latter, and containing material capable of giving up and receiving heat rapidly. As shown in Fig. 4, this material is in the form of spaced perforated metal rings 37, the perforations in adjacent rings being staggered, and the space not filled by the rings being relatively small. In the course of its transfer from one end of the chamber 11 to the other, the gas passes through the regenerator 36, giving up a portion of its heat to the rings 37 during its upward passage, and absorbing heat from said rings during its downward passage.

In order to obtain an effective heat transfer from the burner 12 to the gas within the apparatus the lower end of the casing 10 is preferably connected with the lower end of the regenerator 36 by a series of tubes 38 which are disposed in the form of loops or coils and upon which the flame of the burner may be directed.

The cycle of operations is as follows: Starting with the displacer at the bottom of the chamber, as shown, and with both valves closed, the displacer 20 starts upwardly, transferring the cool gas in the cool upper end of the chamber 11 to the heated lower end thereof through the regenerator 36. The gas is thereupon heated, and, since the volume of the chamber 11, and consequently of the gas therein, is fixed or constant, the pressure of said gas rises. At a definite point in the stroke the pressure equals or slightly exceeds the reservoir pressure. The outlet valve 19 then opens. The displacer proceeds on its upward stroke. The pressure remains nearly constant, except as the reservoir pressure increases slightly, and gas is forced into the reservoir. The displacer then starts downwardly, transferring the hot gas in the bottom of the chamber 11 to the upper end thereof where it is cooled. The cooling of the gas causes a decrease in pressure. With the initial drop in pressure to an amount equal to or slightly less than that in the reservoir, the outlet valve closes; and when it is further reduced to an amount equal to or slightly less than that of the region with which the inlet passage 15 communicates, the inlet valve 16 opens. Thereafter the pressure remains substantially constant due to the inflow of gas through said inlet valve. These operations are repeated, the constant volume body of gas in the chamber 11 being alternately heated and cooled by being transferred through the regenerator 36 between the upper and lower ends of the chamber, thereby causing periodic variations in the pressure thereof, and resulting in the transfer of gas from a region of low pressure through the inlet valve 16 to a region of high pressure through the outlet valve 19.

In Fig. 7 is shown a two-stage compressor comprising two units A and B each substantially identical with the single unit above described, although the unit A, which is the low-stage unit, is larger than the high-stage unit B in order to cause the units to share the load properly, and allow for the differences in specific volume of equal masses of gas at different pressures. The inlet conduit 15, provided with the inlet valve 16, communicates with the unit A. The outlet conduit 17, leading to the accumulator 18, and containing the outlet valve 19, communicates with the unit B. Connecting the units is a conduit 39 containing a valve 40, which may be a check valve or a positively operated valve, and which constitutes the outlet valve of the unit A and the inlet valve of the unit B. The displacers 20a and 20b of the units A and B work in alternation, either harmonically or discontinuously, the essential principle being that the displacer 20a be up when the displacer 20b is down, and vice versa, and for the present purposes it may be assumed that they move continuously, and in synchronism, although a somewhat interrupted or staggered operation may slightly increase the efficiency. Suitably timed solenoids, such as that shown in Fig. 6, may be employed to operate these displacers, but as shown in Fig. 7 the stems 25a and 25b of said displacers are provided with pistons 24a and 24b working in fluid pressure cylinders 23a and 23b to the opposite ends of which fluid pressure is alternately admitted from the accumulator 18 and exhausted to the atmosphere under the control of a valve 41 actuated by suitable timing mechanism. A suitable form of valve for this purpose is shown in Fig. 8 and comprises a rotary valve element 42 in a casing 43 having an inlet port 44 communicating through a branch pipe 50 with the accumulator 18, an exhaust port 45, and ports 46 and 47 communicating respectively with pipes 48 and 49. The pipe 48 has branches communicating respectively with the lower end of the cylinder 23a and the upper end of the cylinder 23b, while the pipe 49 has branches communicating respectively with the upper end of the cylinder 23a and the lower end of the cylinder 23b. The valve element 42 is of such a form that when rotated by the timing mechanism it will place the ports 46 and 47 alternately and alternatively in communication with the inlet port 44 and exhaust port 45.

The cycle of operations of this form of the invention is as follows: Starting from the position shown in Fig. 7, the displacer 20a of the low-stage unit A moves up, while the displacer 20b of the high-stage unit B moves down. The gas in the unit A, is, therefore, transferred to the lower end of the chamber 11a where it is heated and its pressure consequently raised, while that in the unit B is transferred to the upper end of the chamber 11b where it is cooled and its pressure consequently reduced. A portion of the gas in the unit A therefore passes through the conduit 39 and valve 40 into the unit B to equalize the pressure. The displacer 20b of the unit B then moves up while the displacer 20a of the unit A moves down into the positions shown. The gas in the unit A is, therefore, transferred to the upper end of the chamber 11a, where it is cooled and its pressure reduced, while that in the unit B is transferred to the lower end of the chamber 11b where it is heated and its pressure raised. As soon as the pressure in the unit B exceeds that in the unit A, the valve 40 closes. The pressure in the unit A falls until it is substantially equal to or slightly less than that in the passage 15, whereupon the inlet valve 16 opens and a fresh supply of gas is drawn into the unit A. Simultaneously the pressure in the unit B rises until it equals or slightly exceeds that in the reservoir 18, whereupon the outlet valve 19 opens and gas is forced from said unit into said reservoir.

It will be obvious that three or more stages or units may be employed, the displacers of successive units operating in alternation as in the case of the two units above described.

The displacers above referred to, while resembling pistons, are not pistons in the usual sense. They are of light, hollow construction and do not need to fit the cylinders closely, since moderate leakage past them does no serious harm, so that they move freely in the cylinders without friction. The pressures on their opposite ends are substantially balanced, so that the gas imposes no considerable resistance to their movement but flows substantially freely back and forth through the regenerators under their impulse. Consequently, the only force required to operate these displacers is that necessary to overcome gravity, gas friction, and what slight friction may develop in the necessary stuffing boxes (not shown), all of which are relatively negligible, so that the net output is not materially affected. In order to cut down weight and thermal capacity as well as loss due to thermal conduction the displacer walls should be thin. Since they can stand an internal pressure considerably higher than external, although not the reverse, it is well to fill them with gas to a pressure equal to the maximum they will encounter. This is easily done by providing them with a vent opening controlled by a small check valve 51 (Fig. 1) allowing gas to flow in up to the maximum pressure experienced. Also, in order to cut down convection inside the displacers and radiation from one end to the other, they should be provided inside with a series of light transverse polished baffles or diaphragms 52 which also serve to brace the structure and which have small perforations 53 therethrough to permit equalization of the pressure.

In each form of the invention above described the opposite ends of the cylinder or chamber constitute, in effect, two relatively hot and cold gas containers from one to the other of which the gas is passed, alternately in opposite directions through the regenerator, by the action of the displacer, this being a simple and effective form which the apparatus may assume in practice.

Also, in each form of the invention described, the regenerator and the cylinder, connected at opposite ends with each other, constitute, in effect, a gas conduit or closed circuit or path through which the gas is circulated alternately in opposite directions by the displacer, being heated and cooled respectively at different points in the circuit in the course of its circulation and its temperature and pressure thereby periodically varied, and the inlet and outlet valves constituting means for rectifying the periodic pressure variations to effect a direct transfer of gas from a region of relatively low pressure to a region of relatively high pressure.

The compressors above described are to be distinguished from the old hot air engine, which they somewhat, but only superficially, resemble, the mode of operation being entirely different. The hot air engine operates to transform heat energy into mechanical power, whereas my compressor utilizes heat energy directly to compress gas. While the mechanical power generated by a heat engine may be employed to operate a mechanical compressor, this, as has been pointed out, requires two steps or stages and two mechanical units between the heat stage and the compression stage. In accordance with the present method and apparatus the heat energy is utilized directly to compress gas without the interposition of mechanical power, there being only one step or stage and one mechanical unit between the heat stage and the compression stage, and the necessity of high stresses and speeds is avoided. Therefore, considered as a compressor, it will be obvious that the efficiency of my apparatus, as well as the output in proportion to size and weight, will be greater than that of an apparatus comprising a power generating unit and a mechanical compressor.

Moreover, the compressed gas can be used in an efficient fluid pressure motor of modern design to generate power to much better advantage than could hot air engines as heretofore constructed and used. Such an installation is illustrated diagrammatically in Fig. 9. In this a compressor C of the type above described is connected to pump gas from a low pressure reservoir $P_1$ to a high pressure reservoir $P_2$. The high pressure reservoir $P_2$ is connected by a conduit $p_2$ with the inlet of a fluid pressure engine or motor M of any suitable and efficient type, the exhaust of said motor being connected by a conduit $p_1$ with the low pressure reservoir $P_1$. By virtue of the reservoirs $P_1$ and $P_2$, considerable volumes of gas may be maintained at substantially constant pressure, by a compressor C having a capacity for the average load only, and the engine or motor M may be of the small high speed type as it is operated independently of impulses originating in the compressor chamber. The conduit $p_2$ may include a heat interchanger S through which the flue gases are passed and by which further heat from the furnace may be extracted at a low temperature level and used to increase the temperature of the gas entering the motor. Preferably, and as shown in Fig. 9, this heat interchanger is so arranged that the working and flue gases flow therethrough in opposite directions, respectively.

In such a combination, the system being permanently closed and, if desired, hermetically sealed, except for the drive shafts and controls, it is desirable that the pressures be high in order to obtain a large output with a given volume. For example, the minimum pressure, or that of the low pressure reservoir $P_1$, may be 1200 lbs. per square inch and that of the high pressure reservoir $P_2$ 2000 lbs. per square inch. When such high pressures are maintained in a closed system it is desirable to employ as a working medium a fixed gas other than air, and for this purpose helium has been found to be particularly suitable. This gas does not pass rapidly through hot metals and is chemically inert, so that it does not attack metals or hydrogenate oils. Such use of helium at high pressure is highly advantageous from the standpoint of the size and weight of a unit of given capacity. Also, being a monatomic gas, its specific heat is low. Consequently, for the same work obtained, it places a relatively low burden upon the regenerator, as it requires less heat to produce the desired temperature changes, and therefore either simplifies the design, improves the efficiency, or both.

What I claim is:

1. A permanently closed energy transformation system comprising a direct thermal compressor, a fluid pressure motor, a conduit system including a heat interchanger between the compressor and the fluid motor, a source of heat, and means for supplying heat, directly from the said source, at a high temperature level to the compressor and at a low temperature level to the said heat interchanger.

2. A permanently closed energy transformation system comprising a direct thermal compressor, a fluid pressure motor, a heat interchanger between the compressor and the fluid motor, and means for supplying heat from the same source directly to the compressor and directly to the said heat interchanger at different temperature levels.

3. A system for the transformation of heat energy into mechanical power comprising a chamber having an inlet and an outlet, a conduit connecting said inlet and outlet, valves for said inlet and outlet respectively, a fluid pressure motor connected in said conduit, alternately operating means to cool gas within the chamber, thereby reducing the pressure in the chamber and drawing gas through the inlet valve, and to heat gas within the chamber thereby increasing the pressure in the chamber and forcing gas through the outlet valve, and a heat interchanger connected in said conduit between said outlet and said fluid motor, the said heat interchanger being arranged to utilize further heat from the same source used for heating the gas in the said chamber, and thus raise the temperature of the gas in its passage from the said chamber to the said fluid motor.

4. A direct thermal compressor containing a displacer of hollow thin walled construction having an inwardly opening check valve which allows gas to enter the said displacer but prevents its escape, thus maintaining an internal pressure substantially equal to the maximum external pressure.

5. A direct thermal compressor comprising a chamber containing a displacer of thin light and hollow construction, and valve means for maintaining the pressure within said displacer substantially equal to the maximum external pressure, the strength of the structure being just adequate to withstand the unbalanced pressure, resulting from this disposition throughout the operating cycle.

6. Thermal apparatus comprising a chamber having a hot region and a cold region, means for heating the hot region, means for cooling the cold region, and a displacer movable in said chamber to transfer gas between said regions, said displacer having an inwardly opening check valve and being of hollow thin walled construction and being of a strength just adequate to withstand the difference between the maximum pressure and minimum pressure developed in said chamber.

VANNEVAR BUSH.